Dec. 19, 1967 R. P. SKINNER 3,358,867
DOUBLE-WALLED THERMALLY INSULATED CONTAINER
Filed April 7, 1965
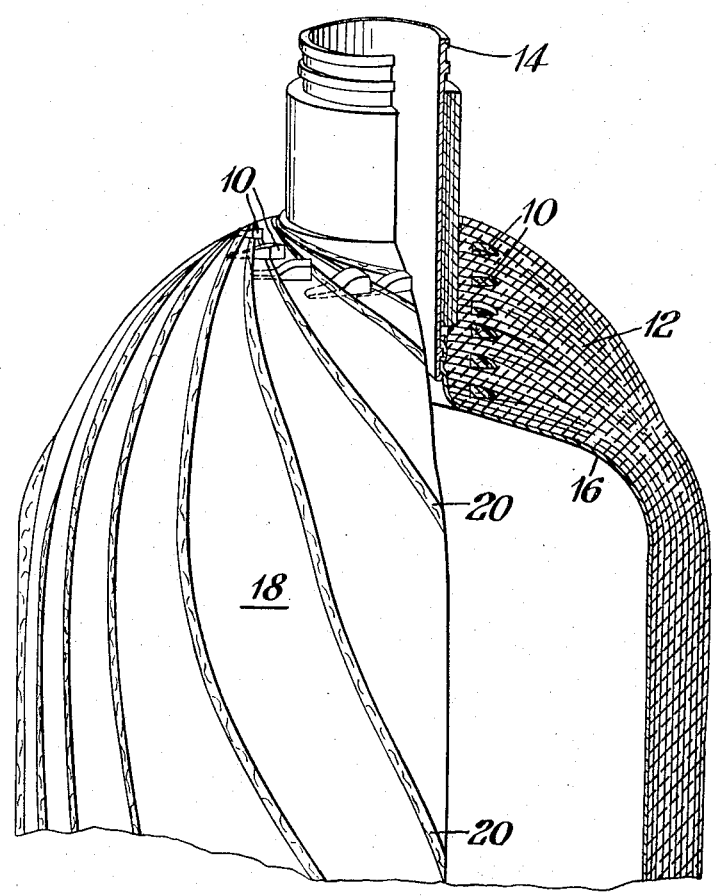
INVENTOR
RANSOM P. SKINNER
BY *John C. ......*
ATTORNEY

United States Patent Office 3,358,867
Patented Dec. 19, 1967

3,358,867
DOUBLE-WALLED THERMALLY INSULATED
CONTAINER
Ransom P. Skinner, Carmel, Ind., assignor to Union
Carbide Corporation, a corporation of New York
Filed Apr. 7, 1965, Ser. No. 446,199
4 Claims. (Cl. 220—14)

ABSTRACT OF THE DISCLOSURE

In a double-walled vacuum-insulated container having a reduced diameter conduit extending through the vacuum space to the inner vessel, compressible spacers are provided in the region of this conduit to uniformly separate the layers of a composite thermal insulation having low conductive material and radiant heat barrier material.

---

This invention relates to double-walled-vacuum-insulated containers for storing materials and liquids at cryogenic temperatures. More particularly, this invention relates to such containers insulated with a composite multilayer insulating material having a conduit extending across the insulation space to provide communication to the container interior where the insulation space in the vicinity of the conduit is wider than other portions of the insulation space.

Double-walled containers which employ a necktube-type of conduit for access into the container interior are generally so constructed that the insulation space between the side walls of the container is relatively narrow in relation to the width of the insulation space in the area of the necktube. This construction permits the use of a relatively long necktube so that ambient-heat inleakage by conduction through the necktube will be reduced. Present day vacuum-insulated containers of this type generally employ composite-multi-layered insulation comprising alternating layers of low conductive material and radiant-heat barrier material. A typical example of this type of construction would be a double-walled container having a storage volume of 10 liters, a side wall insulation space width of about ⅝-inch with the necktube extending between the walls of the container at one end having a length of about 5¼ inches. Side wall insulation space thicknesses on the order of ⅝-inch are feasible because of the efficient combination of the composite multi-layer insulations and a relatively high vacuum in the space on the order of 10 microns or less. If a composite multi-layered insulation of ⅝-inch thickness is applied to the entire insulation space, the region around the necktube would be substantially uninsulated because there will inherently be a relatively large portion of the space in the vicinity of the necktube which would not contain any of the multi-layered insulation material. Therefore the temperature profile around the necktube would not be uniform, resulting in increased conductive heat inleakage to the container interior in the vicinity of the necktube. Furthermore, since there would be little insulation material near the outer periphery of the insulation space in the vicinity of the necktube there will be no radiation barriers in this region, resulting in an increase in radiation heat inleakage to the container interior.

It is the principal object of this invention to provide a composite multi-layered insulated double-walled container wherein the insulation material is substantially uniformly positioned along the container necktube thereby providing for the attainment of a uniform temperature profile in the vicinity of the necktube and thereby also reducing the heat inleakage by radiation in the vicinity of the necktube.

This and other objects and advantages will become apparent from the following description in conjunction with the accompanying figure. This figure is a vertical view, partially in cross-section, of the upper portion of a partially insulated inner vessel.

The double-walled container of this invention comprises an inner vessel, an outer jacket enclosing the inner vessel and spaced therefrom to provide an evacuated insulation space therebetween. An access conduit, such as a necktube, is connected at opposite ends to the outer jacket and the inner vessel and extends through the insulation space to provide access to the container interior within the inner vessel. A composite multi-layered insulation comprising low conductive material and radiant heat barrier material is disposed within the insulation space. In the insulation space in the vicinity of the access conduit or necktube, a plurality of low conductive compressible spacers are interpositioned within the multi-layered insulation to substantially uniformly distribute the composite multi-layered insulation across the insulation space in the vicinity of the access conduit.

As previously indicated, the composite multi-layered insulation disposed between the container walls comprises low conductive material and radiant heat barrier material, thereby substantially reducing the amount of heat inleak due to conduction and radiation. The low conductive material is preferably fibrous and composed of many elements of small cross-sectional dimension having a solid volume not exceeding 10 percent of its gross volume (at least 90 percent voids). A particularly suitable composite insulation consists of alternating layers of a thin flexible metal foil such as aluminum or copper of less than about 0.0008-inch thick and usually about 0.00025-inch thick, and an elastically compressible web or mat of glass fiber. This insulation is described and claimed in U.S. Patent No. 3,009,601 issued Nov. 21, 1961, to L. C. Matsch, the disclosure being incorporated herein to the extent pertinent. Another fidely employed low conductive material is permanently precompacted paper composed of unbonded fibers, as more fully described and claimed in U.S. Patent No. 2,009,600 also issued Nov. 21, 1961, to L. C. Matsch.

Another suitable composite multi-layered insulation is the metal-coated, flexible plastic material described in U.S. Patent No. 3,018,016 issued Jan. 23, 1962, to M. P. Hnilicka, Jr. The metal coating should have a thickness less than about 0.25 micron and yet be sufficiently thick to have an emissivity less than 0.06. The individual layers of metal-coated plastic are preferably permanently deformed, as by crumpling, so as to be free of extensive areas of planar contact. A suggested composite is aluminum-coated polyethylene terephthalate film. Another satisfactory metal-coated substrate is thin metallized paper such as metallized glassine.

Still another composite multi-layered insulation for use in the vacuum space consists of the paper layers and finely-divided radiant heat reflecting bodies of less than about 500 microns in size, being incorporated in and uniformly dispersed through the layers, as well as a binder for cementing the heat reflecting bodies to the fibers. The finely-divided radiant heat reflecting bodies may, for example, be formed of aluminum, copper, nickel and molybdenum. Best results are obtained when the radiant heat reflecting bodies are relatively small, with particle sizes of less than 50 microns as the major dimension. Aluminum and copper paint pigment flakes of less than 0.5 micron thickness are especially suitable. The fibers may, for example, be formed of glass, ceramic, quartz, or potassium titanate. When glass fibers are used, they are preferably of less than 5 microns diameter, while a fiber diameter range of 0.2 to 3.8 microns gives best results. The reflecting bodycontaining paper may, for example, be formed on standard paper-making machines using colloidal silica as a binder.

The composite multi-layered insulation may be applied by winding the composite layers onto the inner vessel. Spiral winding is a particularly advantageous technique for obtaining maximum flexibility. It is preferred, however, that the composite insulation be orbitally wrapped in thin strips or sheets around the inner vessel in the manner described subsequently.

In the vicinity of the necktube, a plurality of spacers are interpositioned between alternate layers of insulation such that both the low conductive component and the radiant heat barrier component are substantially uniformly distributed along the length of the necktube. The right hand portion of the figure shows such a construction where a plurality of spacers 10, each axially aligned to one another relative to the necktube, uniformly distribute the composite insulation 12 along the length of the necktube 14. The spacers 10 may be positioned between adjacent pairs of layers having a low conductive component and a radiant heat component or between several such pairs. If the composite insulation is applied in the form of a spiral or in the form of concentric cylindrical layers, spacers 10 may have an annular or doughnut-like configuration and completely encircle the necktube. If the insulation is orbitally wrapped, however, the spacers 10 would preferably have a rectangular configuration and would be positioned within the insulation in an either essentially tangential relationship or essentially radial relationship to the necktube as shown in the left hand portion of the figure. Rectangular bats of glass fiber material 3 inches in length, ⅝-inch in width and ½-inch in thickness have been found to be suitable spacers for orbitally-wrapped composite multi-layered insulation. Regardless of the manner in which the multi-layered insulation is applied, spacers 10 must be constructed of a compressible material such as micro-fiber glass so that the spacers can be shaped to the insulation structure as the insulation is applied without unduly stressing the insulation material.

The orbital wrap structure shown in the left hand portion of the figure is the preferred construction. In a broad sense, orbital wrapping comprises the steps of providing at least two composite strips of the insulation, e.g. fibrous sheeting underlayer 20 and a narrower metal foil 18 on the opposite sides of the inner vessel 16, and securing an end of each composite strip to the vessel surface. The vessel is suspended vertically and rotates around its vertical axis. As the vessel is rotated, the composite insulation strips are simultaneously orbited around the vessel in a plane which cuts the vertical axis of the vessel at an angle. In this manner, the strips are continuously delivered to the vessel from the top to the bottom thereof forming a continuous insulation mat of criss-cross strips. As each of the composite insulation strips are delivered to the vicinity of the necktube, a spacer 10 is applied on top of a previously delivered strip cross-wise to the strip to be delivered such that the composite strip to be delivered is placed across at least a portion of the spacer as shown in the left hand portion of the figure. This produces the effect of an annular ring of spacers around the necktube in a plane perpendicular to the vertical axis of the necktube. As the orbital wrapping sequence is continued, composite strips will be applied over the strips previously delivered with spacers applied as described above such that a second angular ring of spacers around the necktube will be formed above the lower ring. Completion of orbital wrapping a cross section taken in the vicinity of the necktube would appear very similar to that shown in the right hand portion of the figure. The method and apparatus involved in orbital wrapping a composite multi-layered insulation is described in copending application Ser. No. 338,526, filed Jan. 7, 1964, now Patent No. 3,229,882 and the disclosure therein is incorporated here by reference.

It can be seen from the figure that the use of spacers in combination with composite insulation permits such composite multi-layered insulation to be efficiently employed both along the side walls of a container where the insulation space is narrow and in the vicinity of a container necktube where the insulation space must be relatively large to accommodate the elongated necktube. Such construction improves the efficiency of composite multi-layered insulation when applied to the aforementioned 10-liter container on the order of about 20%.

What is claimed is:

1. A double-walled, vacuum-insulated container which comprises an inner vessel; an outer jacket enclosing said inner vessel and spaced therefrom to provide an evacuated insulation space therebetween; a conduit connected at opposite ends to a rim of an opening in said outer jacket and to a rim of an opening in said inner vessel and extending through such space, said conduit having smaller cross-sectional area than said inner vessel such that said insulation space is wider between the conduit and outer jacket than between said inner vessel and said outer jacket; a composite multi-layered insulation disposed within said space comprising low conductive material and radiant heat barrier material; and a plurality of low conductive, compressible spacers substantially uniformly interpositioned in said composite multi-layered insulation across said space in the vicinity of said conduit in superimposed relation to each other and aligned parallel to the conduit longitudinal axis such that the low conductive and radiant heat barrier components of said composite multi-layered insulation are uniformly separated across said space in the vicinity of said conduit.

2. A container according to claim 1 wherein said composite multi-layered insulation is provided in the form of composite strips of fibrous sheeting underlayer and metal foil and orbitally wrapped onto said inner vessel; and wherein said spacers are positioned in the vicinity of said conduit crosswise to said composite strips to form annular rings of spacers around said conduit with longitudinally adjacent annular rings of said spacers being axially aligned parallel to the longitudinal axis of said conduit.

3. A container according to claim 1 in which the compressible spacers are formed of glass fiber.

4. A container according to claim 2 in which said fibrous sheeting underlayer and spacers are formed of glass fiber, and said metal foil is formed of aluminum.

References Cited

UNITED STATES PATENTS

| 1,215,064 | 2/1917 | Ryan | 220—9 |
| 1,956,323 | 4/1934 | Gregg | 220—9 |
| 3,007,596 | 11/1961 | Matsch | 220—9 |

FOREIGN PATENTS

| 1,299,395 | 6/1962 | France. | |

JOSEPH R. LECLAIR, *Primary Examiner.*

JAMES R. GARRETT, *Examiner.*